United States Patent
Schaefer et al.

(10) Patent No.: US 12,140,070 B2
(45) Date of Patent: Nov. 12, 2024

(54) SPARK-IGNITED RECIPROCATING PISTON INTERNAL COMBUSTION ENGINE WITH A PRE-CHAMBER IGNITION SYSTEM

(71) Applicant: Bayerische Motoren Werke Aktiengesellschaft, Munich (DE)

(72) Inventors: Erik Schaefer, Munich (DE); Daniel Taterra, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/799,481

(22) PCT Filed: Jan. 18, 2021

(86) PCT No.: PCT/EP2021/050912
§ 371 (c)(1),
(2) Date: Aug. 12, 2022

(87) PCT Pub. No.: WO2021/160374
PCT Pub. Date: Aug. 19, 2021

(65) Prior Publication Data
US 2023/0070311 A1   Mar. 9, 2023

(30) Foreign Application Priority Data

Feb. 14, 2020  (DE) .................. 10 2020 103 863.1

(51) Int. Cl.
*H01T 13/54* (2006.01)
*F02B 19/12* (2006.01)
*F02B 19/18* (2006.01)

(52) U.S. Cl.
CPC .............. *F02B 19/12* (2013.01); *F02B 19/18* (2013.01); *H01T 13/54* (2013.01)

(58) Field of Classification Search
CPC ........... H01T 13/54; F02B 19/12; F02B 19/18
See application file for complete search history.

(56) References Cited

U.S. PATENT DOCUMENTS

| 5,345,758 | A  | * | 9/1994 | Bussing ................. C23C 4/126 |
| | | | | 60/39.38 |
| 6,460,506 | B1 | * | 10/2002 | Nevinger ............... H01T 13/54 |
| | | | | 313/143 |

(Continued)

FOREIGN PATENT DOCUMENTS

DE   10 2014 111 897 A1   4/2015
DE   10 2016 206 992 A1   10/2017
(Continued)

OTHER PUBLICATIONS

PCT/EP2021/050912, International Search Report dated May 3, 2021 (Three (3) pages).

(Continued)

*Primary Examiner* — Gonzalo Laguarda
(74) *Attorney, Agent, or Firm* — Crowell & Moring LLP

(57) ABSTRACT

A pre-chamber ignition system for a spark-ignited reciprocating piston internal combustion engine includes a housing where the housing is installable in a cylinder head of the spark-ignited reciprocating piston internal combustion engine and where the housing has a cavity. An ignition device is disposed in the housing and the ignition device projects into the cavity of the housing. A cover covers the cavity with respect to a combustion chamber of the spark-ignited reciprocating piston internal combustion engine and the cavity and the combustion chamber are connectable together in a gas-guiding manner by an aperture in the cover. The housing consists of a material having a thermal conductivity of more than 170 W/(m*K) and the cover consists of a material having a thermal conductivity of less than 170 W/(m*K).

2 Claims, 1 Drawing Sheet

(56) References Cited

U.S. PATENT DOCUMENTS

| | | | |
|---|---|---|---|
| 7,237,526 B2 | 7/2007 | Tourteaux et al. | |
| 8,912,716 B2 * | 12/2014 | Hwang | H01T 13/54 |
| | | | 313/143 |
| 8,915,227 B2 * | 12/2014 | Johng | F02P 13/00 |
| | | | 123/262 |
| 10,109,986 B2 | 10/2018 | Niessner et al. | |
| 10,777,976 B1 * | 9/2020 | Gozawa | H01T 13/32 |
| 11,008,931 B2 * | 5/2021 | Takada | F02B 19/18 |
| 2005/0000484 A1 * | 1/2005 | Schultz | F02B 19/12 |
| | | | 313/143 |
| 2005/0268882 A1 | 12/2005 | Robinet et al. | |
| 2006/0144362 A1 * | 7/2006 | Robinet | F02B 19/12 |
| | | | 123/270 |
| 2012/0242215 A1 * | 9/2012 | Hwang | H01T 13/54 |
| | | | 313/143 |
| 2019/0203636 A1 | 7/2019 | Endo et al. | |
| 2019/0226387 A1 | 7/2019 | Hayakawa et al. | |

FOREIGN PATENT DOCUMENTS

| | | |
|---|---|---|
| DE | 10 2016 120 984 A1 | 5/2018 |
| DE | 10 2018 221 429 A1 | 6/2020 |
| EP | 0 097 320 B1 | 9/1987 |
| WO | WO 2007/092972 A1 | 8/2007 |
| WO | WO 2008/031482 A1 | 3/2008 |
| WO | WO 2018/087418 A1 | 5/2018 |

OTHER PUBLICATIONS

German Search Report issued in German application No. 10 2020 103 863.1 dated Oct. 5, 2020, with Statement of Relevancy (Eight (8) pages).

* cited by examiner

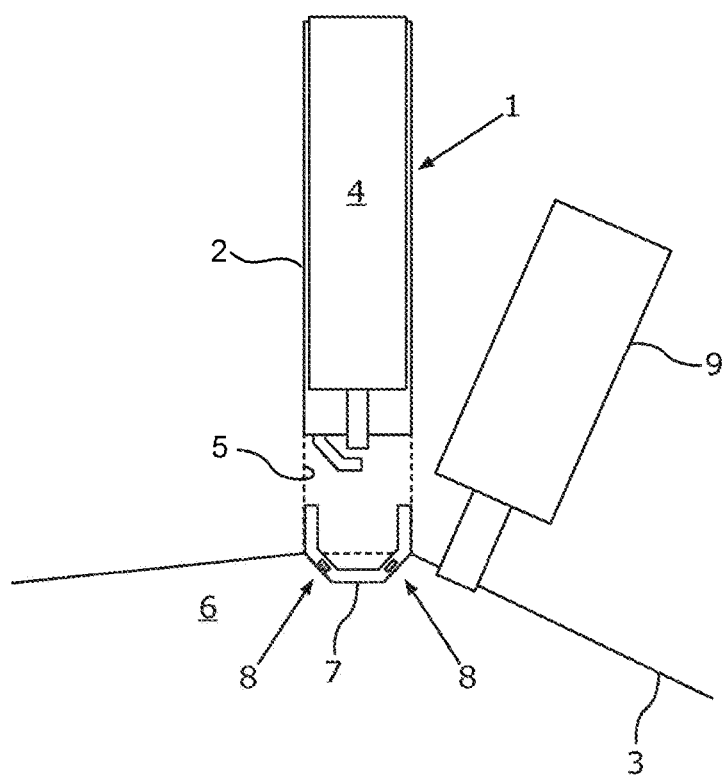

SPARK-IGNITED RECIPROCATING PISTON INTERNAL COMBUSTION ENGINE WITH A PRE-CHAMBER IGNITION SYSTEM

BACKGROUND AND SUMMARY OF THE INVENTION

The invention relates to a spark-ignited reciprocating piston internal combustion engine with a pre-chamber ignition system.

With regard to the technical context, reference is made, for example, to German laid-open specification DE 10 2014 111 897 A1. This document discloses an ignition device for igniting fuel/air mixtures in a combustion chamber of an internal combustion engine by means of a corona discharge, having an ignition electrode, an outer conductor which surrounds the ignition electrode and has a front end and a rear end, and an electrical insulator which is arranged between the ignition electrode and the outer conductor and from which at least one tip of the ignition electrode protrudes. The at least one tip of the ignition electrode is arranged in a space that is shielded by a cap which is associated with the insulator and has an inner side facing the insulator and an outer side facing away from the insulator as well as one or more holes by means of which the shielded space is connected to a space, the combustion chamber, arranged on the outer side of the cap.

The international patent application with international publication number WO 2008/031482 A2 further discloses a spark plug for igniting a combustible gas mixture in an internal combustion engine, comprising:
an ignition electrode,
an electrical supply line to which the ignition electrode is connected,
an insulator body through which the supply line is passed,
a housing head which rests in a sealing manner on the insulator body and bears an outer thread for screwing into an internal combustion engine,
a tube housing which is fixed on the housing head, surrounds the insulator body and has a hexagon head,
wherein the tube housing surrounds an insulator body holder which is welded to the housing head via a weld seam and presses the insulator body with a pre-stress against the housing head.

For the further technical context, reference is further made to German laid-open specification DE 10 2016 120 984 A1. That laid-open specification discloses a pre-chamber spark plug for a gas-operated internal combustion engine and a method for the production thereof.

A spark plug is further known from German laid-open specification DE 10 2016 206 992 A1, from which the present invention proceeds. The spark plug is in particular a pre-chamber spark plug, having a housing, an ignition electrode and a ground electrode, wherein the ignition electrode can be subjected to an electrical voltage via a supply line, and wherein the supply line extends at least partially within an insulator, wherein at least one discharge region of the housing is made from a material having a thermal conductivity of more than 170 W/(m*K).

In order to ensure stable operation (without pre-ignition) in the top right ignition map (high speed, high load) of an internal combustion engine, in particular a high-power internal combustion engine, it is necessary to use a pre-chamber ignition system made of a material having a thermal conductivity of >250 W/(m*K). However, this material has the disadvantage in the bottom left ignition map (low speed, low load) that too much heat (energy) is lost.

The object of the present invention is to provide a measure with which the ignition capability of a pre-chamber ignition system can be ensured in a high load and/or speed range or on late ignition of an internal combustion engine.

The above-mentioned technical problem is solved by the use of a combination material for the pre-chamber ignition system. The upper part of the pre-chamber ignition system continues to be made of a very highly thermally conductive material having a thermal conductivity of preferably more than 170 W/(m*K), in order to be able to dissipate the excess heat at the cylinder head.

The cap material of the cover of the pre-chamber ignition system is so designed according to the invention that no pre-ignition occurs at the rated power point (region of maximum power output of the internal combustion engine), but it is as hot as possible. Suitable materials for this purpose are, for example, those having a thermal conductivity of less than 170 W/(m*K), such as the following alloys, for example:
TZM, a molybdenum alloy,
tungsten/CuCrlZr 50/50,
nickel 2.4066,
Inconel, a highly corrosion- and heat-resistant nickel alloy, or
steel 1.4859 (20% Cr).

By the integration of two different materials for the pre-chamber ignition system (thermal conductivity>170 W/(m*K) for the housing and a thermal conductivity of less than 170 W/(m*K) for the cover, in each case in the solution-annealed state (CuCrlZr) at 20° C.), the low load for the spark-ignited internal combustion engine and late ignition timings (for example for the heating of an exhaust aftertreatment unit) can be achieved, since only a small amount of energy from the combustion in the pre-chamber combustion system is lost on the path into the main combustion chamber. In addition, the ignition device, for example a spark plug in the pre-chamber ignition system, heats up to a lesser extent, since the heat remains in the lower part (cover region) of the pre-chamber ignition system.

Thus, the cover of the pre-chamber ignition system (the cover is the part of the pre-chamber ignition system which is situated largely in the combustion chamber) is manufactured from one of the above-mentioned materials.

This other cover material is welded to the housing, for example they are welded together by friction welding or in a 3D printing process.

The invention will be explained briefly hereinbelow with reference to an exemplary embodiment.

BRIEF DESCRIPTION OF THE DRAWING

The FIGURE shows a section through a pre-chamber ignition system.

DETAILED DESCRIPTION OF THE DRAWING

The FIGURE shows a section through a pre-chamber ignition system 1 for a spark-ignited reciprocating piston internal combustion engine, in particular a high-power internal combustion engine, having a housing 2, which in this exemplary embodiment is formed radially outward of a cylinder head material of a cylinder head 3 of the reciprocating piston internal combustion engine. An ignition device 4 which projects into a cavity 5 in the housing 2 is arranged in the pre-chamber ignition system 1. A spark plug, a corona ignition system or another ignition device for spark-ignited internal combustion engines, for example, can be provided as the ignition device.

Furthermore, on the side remote from the ignition device 4, the cavity 5 is covered with respect to a combustion chamber 6 of the reciprocating piston internal combustion engine by a cover 7. The cover 7 has at least a first aperture 8 which connects the cavity 5 and the combustion chamber 6 together in a gas-guiding manner. In the present exemplary embodiment, two apertures 8 can be seen. These apertures 8 can be, for example, bores in the cover 7. The cover 7 can itself be connected to the cylinder head 3 by substance-to-substance bonding and/or interlocking engagement or in a 3D printing process.

The FIGURE further shows a fuel injector 9 with which fuel can be introduced into the combustion chamber 6 of the reciprocating piston internal combustion engine in order to produce a combustible fuel/air mixture in the combustion chamber 6.

In summary, it can be said that the above-mentioned technical problem is solved by the use of a combination material for the pre-chamber ignition system 1. The upper part of the pre-chamber ignition system 1 (in the region of the ignition device 4) continues to be made of a very highly thermally conductive material having a thermal conductivity of preferably >170 W/(m*K), in order to be able to dissipate the excess heat at the cylinder head 3.

The material of the cover 7 of the pre-chamber ignition system 1 is so designed according to the invention that no pre-ignition occurs at the rated power point (region of maximum power output of the internal combustion engine), but it is as hot as possible. Suitable materials for this purpose are, for example, those having a thermal conductivity of <170 W/(m*K), such as the following alloys, for example:

TZM, a molybdenum alloy,
tungsten/CuCr1Zr 50/50,
nickel 2.4066,
Inconel, a highly corrosion- and heat-resistant nickel alloy,
or steel 1.4859 (20% Cr).

By the integration of two different materials for the pre-chamber ignition system 1 (thermal conductivity>170 W/(m*K) for the housing 2 and a thermal conductivity of less than 170 W/(m*K) for the cover 7, in each case in the solution-annealed state (CuCr1Zr) at 20° C.), the low load for the spark-ignited internal combustion engine and late ignition timings can be achieved, since only a small amount of energy from the combustion in the pre-chamber combustion system 1 is lost on the path into the combustion chamber 6. In addition, the ignition device 4, for example a spark plug in the pre-chamber ignition system 1, heats up to a lesser extent, since the heat remains in the lower part (cover region) of the pre-chamber ignition system 1.

Thus, the cover of the pre-chamber ignition system 1 is produced according to the invention from one of the above-mentioned materials and not from the standard material of the housing 2.

Finally, it should also be said that the configuration according to the invention of the pre-chamber ignition system 1 can be used both for passive pre-chamber ignition systems, as shown here, and for active pre-chamber ignition systems, which have their own means for introducing fuel into the cavity 5.

In a further exemplary embodiment, the housing 2, instead of being formed by the cylinder head material, can also be in the form of a separate housing 2 which is introduced into the cylinder head 3.

LIST OF REFERENCE CHARACTERS 1. pre-chamber ignition system
2. housing
3. cylinder head
4. ignition device
5. cavity
6. combustion chamber
7. cover
8. aperture
9. fuel injector

What is claimed is:

1. A pre-chamber ignition system of a spark-ignited reciprocating piston internal combustion engine, comprising:
   a housing, wherein the housing is installable in a cylinder head of the spark-ignited reciprocating piston internal combustion engine and wherein the housing has a cavity;
   an ignition device, wherein the ignition device is disposed in the housing and wherein the ignition device projects into the cavity of the housing; and
   a cover, wherein the cavity is covered with respect to a combustion chamber of the spark-ignited reciprocating piston internal combustion engine by the cover, wherein the cover has an aperture, and wherein the cavity and the combustion chamber are connectable together by the aperture in a gas-guiding manner;
   wherein the housing consists of a material having a thermal conductivity of more than 170 W/(m*K); and
   wherein the cover consists of a material having a thermal conductivity of less than 170 W/(m*K) such that no pre-ignition occurs at a region of maximum power output of the internal combustion engine and wherein the material of the cover is:
   tungsten/CuCr1Zr 50/50; or
   nickel 2.4066; or
   steel 1.4859 (20% Cr).

2. The pre-chamber ignition system according to claim 1, wherein the housing and the cover are connected together by welding or by 3D printing.

* * * * *